United States Patent [19]

Kawa

[11] 3,841,583

[45] Oct. 15, 1974

[54] MAGNETIC TAPE DRIVING SYSTEM

[75] Inventor: Ryuichi Kawa, Yokohama, Japan

[73] Assignee: Ricoh Co. Ltd., Tokyo, Japan

[22] Filed: Dec. 27, 1972

[21] Appl. No.: 318,755

[30] Foreign Application Priority Data

Dec. 30, 1971 Japan .............................. 46-1166

[52] U.S. Cl. .............................. 242/201, 318/7

[51] Int. Cl. .............................. B11b 15/32, G03b 1/04

[58] Field of Search .............................. 242/201, 204, 75.51; 318/6, 7

[56] References Cited

UNITED STATES PATENTS

| | | | |
|---|---|---|---|
| 2,970,788 | 2/1961 | Warncke | 242/75.51 |
| 3,501,682 | 3/1970 | Jacoby | 318/7 |

*Primary Examiner*—Leonard D. Christian

*Attorney, Agent, or Firm*—Cooper, Dunham, Clark, Griffin & Moran

[57] ABSTRACT

A magnetic tape drive system for maintaining a tape supply reel at a predetermined rotational speed during the first half of a fast tape winding operation while maintaining a tape take-up reel at the predetermined rotational speed during the second half of the fast tape winding operation, which system includes a fast control circuit responsive to the rotational speed of a first motor driving the tape supply reel and a second control circuit responsive to the rotational speed of a second motor driving the tape take-up reel, the first and second control circuits having an electrical valve which is connected to the second motor and which controls the torque of the second motor in dependence on operating conditions of said first and second control circuits.

8 Claims, 6 Drawing Figures

MAGNETIC TAPE DRIVING SYSTEM

BACKGROUND OF THE INVENTION

The present invention relates to a magnetic tape driving system for a magnetic recording and reproduction device in which supply and take-up reels are directly driven by independent motors, and more particularly a magnetic tape rewind and fast-forward system for the magnetic tape driving system.

In general, cassette type and cartridge tape recorders employ a transfer and reeling system having a supply or reel and take-up reels which are driven by a supply motor and a drive motor. During fast winding the motor which drives the reel which takes up the magnetic tape, to the supply reel for rewind or the take-up reel for fast-forward, is driven with a greater torque than the reel which pays off the tape. This allows the tape to be wound, while maintaining sufficient tension to prevent unravelling. In principle, the magnetic tape is therefore uniformly wound around the reel. However, DC motors have an inherent defect that the rotational speed is considerably decreased with an increase in load. Prior art magnetic tape driving or transport system cannot therefore wind the magnetic tape uniformly because tape transport speed varies over a wide range due to the change in the diameter of the magnetic tape on the supply and take-up reels, and also due to various frictional resistance encountered in the tape transport system.

To overcome the above problem there has been devised and demonstrated a magnetic tape transport system in which an electric motor motor which directly drives the reel which takes up the magnetic tape during fast winding is rotated at a predetermined constant speed regardless of the variation in load. However, if the diameter of the magnetic tape role on the take-up reel at the end of fast winding is twice what it was at the beginning of the operation, the tape transport speed at the end of the fast winding operation has increased fa a factor of two during the operation. Also, the rotational speed of the supply reel increased by four times.

Magnetic tape cassettes are also used in electronic data processing systems to record and reproduce digital signals. In some systems it is required that digital signals recorded on the magnetic tape be reproduced or read out even when the magnetic tape transport is reversed in direction. Therefore, variation of the tape transport speed must be minimized. Ideally the tape transport speed must be constant and variations in the rotational speeds of the reels must be minimized so that the magnetic tape is uniformly wound on the reel. However, prior art magnetic tape transport systems cannot satisfy the above requirements.

An important object of the present invention is therefore to provide a magnetic tape drive system for a magnetic recording and reproduction device in which the variation of tape transport speed is reduced over prior art systems during fast winding operations.

In order to achieve this object, the present invention contemplates the maintaining of a tape supply reel at a predetermined rotational speed during the first half of a fast tape winding operation while maintaining a tape take-up reel at the predetermined rotational speed during the second half of the fast tape winding operation. To this end, a magnetic tape drive system of the present invention is provided with a first motor driving the tape supply reel, a second motor driving the tape take-up reel, and an electrical valve connected to the second motor for controlling the torque of the second motor. The electrical valve forms a part of first and second control circuits which are responsive to the rotational speeds of the first and second motors, respectively. If the rotational speed of the first motor exceeds a predetermined value, the first control circuit is rendered operative to cause the electrical valve to increase the electric current flow through the second motor in a direction to brake the first motor so that the rotational speed of the first motor is maintained at the predetermined rotational speed. If the rotational speed of the second motor exceeds the predetermined value, then the second control circuit is rendered operative to cause the electrical valve to increase the electric current flow through the second motor so that the torque of the second motor is increased and, therefore, the rotational speed of the second motor is reduced to the predetermined value. In this manner, the variation in the tape transport speed is reduced over the prior art systems.

The above and other objects, features and advantages of the present invention will become more apparent from the following description of one preferred embodiment thereof taken in conjunction with the accompanying drawing.

BRIEF DESCRIPTION OF THE DRAWING

Like same reference numerals are used to designate similar parts throughout the figures.

DESCRIPTION OF THE PREFERRED EMBODIMENT

Figure 1:
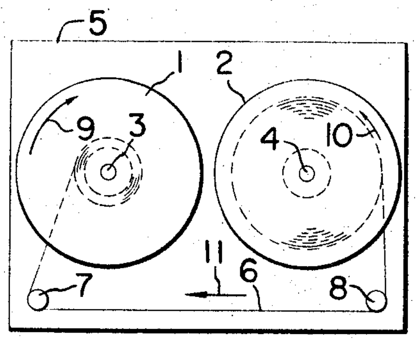
FIG. 1(A) is a schematic view of a magnetic recording and reproduction device, illustrating the first half of a rewinding operation.
FIG. 1(B), is a similar view illustrating the second half of the rewinding operation.
Figure 1:
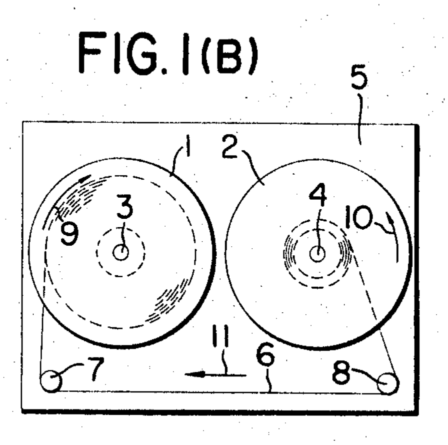

Referring to FIGS. 1(A) and 1(B), tape supply and take-up reels 1 and 2 are mounted on spindles 3 and 4 which in turn are supported by a chassis 5 and directly coupled to electric motors (not shown). Magnetic tape 6 is transferred from the supply reel 1 around guide rollers 7 and 8 to the take-up reel 2. In rewinding, the supply reel 1 is drived with a relatively strong torque in a clockwise direction indicated by an arrow 9 by the motor driving the spindle 3, thereof whereas the take-up reel 2 is driven with a relatively low torque in a counterclockwise direction as indicated by a arrow 10 by the motor driving the spindle 4. Thus, the magnetic tape 6 is transported in the direction indicated by an arrow 11 during rewinding.

In the first half of the rewinding operation in which the diameter of the magnetic tape 6 wound around the supply reel 1 is less than that of the magnetic tape 6 on the take-up reel 2 as shown in FIG. 1(A), the rotational speed of the motor driving the reel 1 is higher than that of the motor driving the take-up reel 2. Conversely when the diameter of the magnetic tape 6 wound around the supply reel 1 becomes larger than that of the magnetic tape 6 on the take-up reel 2, the driving motor for the supply reel 1 rotates at a slower speed than the driving motor for the take-up reel 2. In the instant embodiment, during the first half of the rewinding operation the rotational speed of the driving motor for the supply reel 1 is maintained constant independent of load variation and during the last half of the rewinding operation (See FIG. 1(B)), the rotational speed of the driving motor for the take-up reel 2 is maintained constant. Therefore, the tape transport speed is gradually increased in the first half of the rewinding operation but is gradually decreased in the last half. The variation in the tape transport speed in rewinding is therefore very small compared with prior art systems in which the driving motor for the supply reel is maintained at a constant speed throughout the entire rewinding opertion. Similarly the variation in the rotational speed of both the supply and take-up reels 1 and 2 is less.

Figure 2:
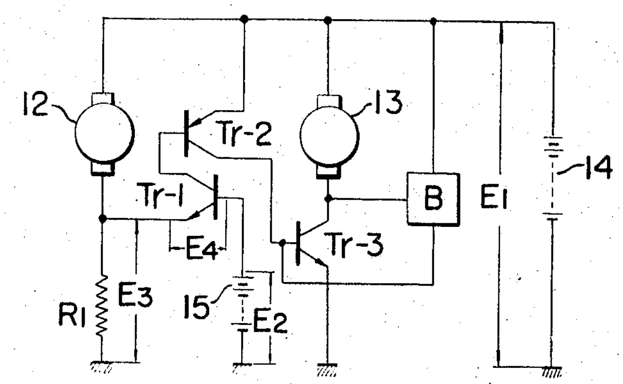
FIGS. 2 and 3 are diagrams of control circuits of a magnetic tape driving system in accordance with the present invention.
Figure 3:
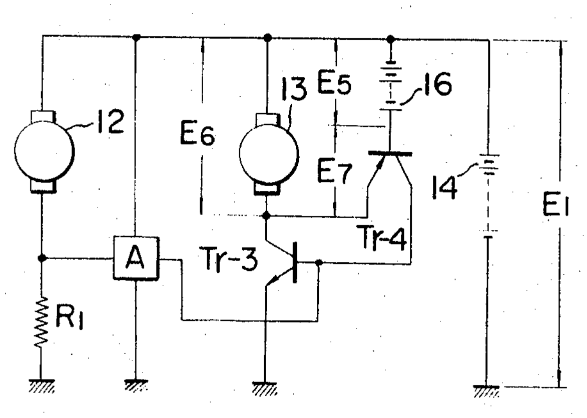

FIG. 2 is a circuit diagram of first control means to maintain the rotational speed of the supply reel 1 at a predetermined value *a* during the first half of a rewinding operation, and FIG. 3 is a circuit diagram of second control means to maintain the rotational speed of the take-up reel 2 at the value *a* during the second half of the rewinding operation. The value *a* is that at which the speeds of the supply and take-up reels 1 and 2 are equal when the rewinding operation is half completed, since the diameter of the tape wound around both reels is equal at this point.

Referring to FIG. 2, first and second electric motors 12 and 13 directly drive the reels 1 and 2 respectively, and are energized from a source of electrical power such as a battery 14. A resistor $R_1$ is connected in series with the motor 12, and an electrical valve here shown as a transistor TR-3 is connected in series with the motor 13. The motor 12 is arranged to drive the reel 1 clockwise during a rewinding operation, and the motor 13 is arranged to apply a torque to the reel 2 in a counterclockwise direction against the torque of the motor 12. The torque of the motor 12 is greater than that of the motor 13 during rewinding, so the tape is transported in the direction of the arrow 11 and a back tension is applied to the tape by the motor 13 to prevent unravelling and to control the transport speed.

A transistor TR-1 has its emitter connected to the junction between the motor 12 and the resistor $R_1$, and its base connected to an electrical bias source such as a battery 15. The collector of the transistor TR-1 is connected to the base of a transistor TR-2, the emitter of which is connected to the battery 14. The collector of the transistor TR-2 is connected to the base of the transistor TR-3. The resistor $R_1$, transistors TR-1 and TR-2 and the battery 15 constitute means for sensing the rotational speed of the motor 12, and the transistor TR-3 constitutes means for increasing the current flow through the motor 13 as will be explained below. The first control means thus described is represented by a box A in FIG. 3, and the second control means of FIG. 3 is represented by a box B in FIG. 2.

In FIG. 3, the second control means comprises a transistor TR-4 having its base connected through an electrical bias source such as a battery 16 to the battery 14. The emitter of the transistor TR-4 is connected to the junction between the motor 13 and the collector of the transistor TR-3, and the collector of the transistor TR-4 is connected to the base of the transistor TR-3. The transistor TR-4 constitutes means for sensing the rotational speed of the motor 13, and the transistor TR-3 constitutes means for increasing the current flow through the motor 13 as will be explained below. It will be noticed that the transistor TR-3 is common to both the first and second control means.

In operation, during the first half of the rewinding operation, since there is relatively little tape on the reel 1, the speed of the motor 12 will rise to the value *a*. At this point, the current through the motor 12 will have a predetermined value producing a predetermined voltage drop $E_3$ across the resistor $R_1$, both of these values corresponding to the value *a*. In this case, the voltage $E_3$ will be equal to the voltage $E_2$ of the battery 15 minus the base-emitter drop $E_4$ of the transistor TR-1. The value of $E_2$ is selected so that when the speed of the motor 12 slightly exceeds the value *a*, $E_3 + E_4 < E_2$ since the current flow through the motor 12 decreases.

As a result, the transistor TR-1 becomes forward biased, and the transistor TR-2 also becomes forward biased with the result that the base voltage of the transistor TR-3 rises to increase the collector current through the transistor TR-3 and therefore the current flow through the motor 13. This results in the torque of the motor 13 increasing to brake the motor 12 down to the speed value *a*. In this manner, the rotational speed of the motor 12 is maintained at the value *a* during the first half of the rewinding operation. During the second half of the operation, since there is more tape on the reel 1 than on the reel 2, and since the reel 2 is maintained at the speed value *a*, the speed of the reel 1 will always be below the value *a* and the first control means will be automatically de-energized.

At the point where the rewinding operation is half completed, the speed of the reel 2 will have increased to the value *a*, and the speeds of the reels 1 and 2 will both be at the value *a*. During the first half of the rewinding operation, since there was more tape on the reel 2 than on the reel 1, the speed of the reel 2 was always lower than the speed of the reel 1 and lower than the value *a*, and the second control means was automatically de-energized as will be understood from the explanation below. Since the motor 13 is being rotated clockwise although the torque thereof is in a counterclockwise direction as viewed in FIGS. 1(A) and 1(B), the counter-electromotive force $E_6$ thereof appears at the junction between the motor 13 and the transistor TR-3. The voltage $E_5$ of the battery 16 is selected so that when the motor 13 is being rotated at the speed value *a*, $E_6 = E_5 + E_7$ where $E_7$ is the base-emitter drop of the transistor TR-4. If the speed of the motor 13 slightly exceeds the value *a*, the value of $E_6$ will rise so that $E_6 > E_5 + E_7$.

The transistor TR-4 thus becomes forward biased so that the voltage at the base of the transistor TR-3 increases and the collector current of the transistor TR-3 also increases. The current flow through the motor 13 is thereby increased so the torque of the motor 13 is increased so that the speed of the motor 13 is reduced to the value *a*. In this manner, the speed of the motor 13 is maintained at the value a during the second half of the rewinding operation.

Figure 4:
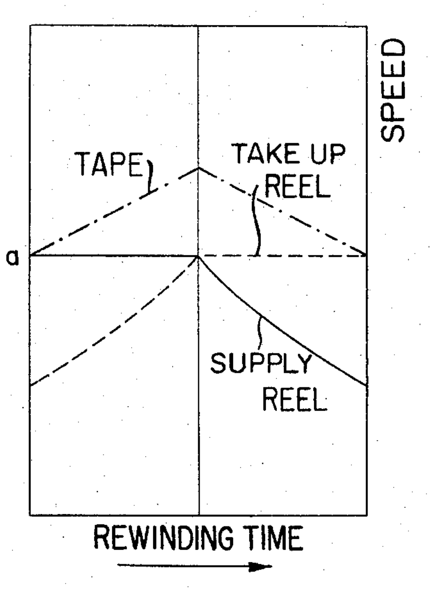
FIG. 4 is a graph illustrating the rewinding characteristics of the magnetic tape driving system of a present invention.
Figure 5:
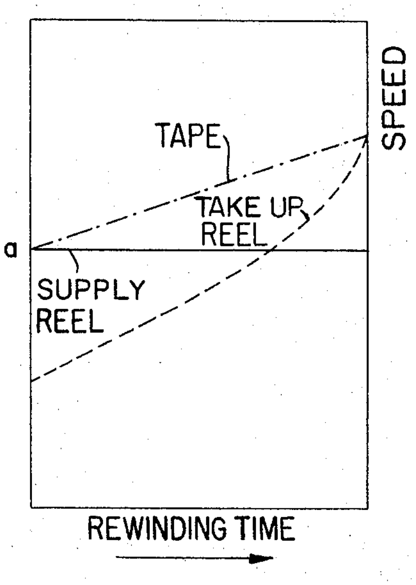
FIG. 5 PRIOR ART
FIG. 5 is a graph illustrating the rewinding characteristics of a prior art magnetic tape driving system for comparison with the present invention.

FIG. 4, illustrates the performance of a tape driving system of the invention, which clearly shows that the tape transport speed increases during the first half of the rewinding operation in which the speed of the supply reel is held constant, and decreases during the second half of the operation in which the speed of the take-up reel is held constant. Comparison with FIG. 5, in which the supply reel speed is maintained constant throughout the entire rewinding operation, in the manner of the prior art, will show that the variation in the tape transport speed is reduced by a factor of two.

Although a rewinding operation has been herein described for explaining the principles of the invention, the invention may be applied to a fast-forward operation. Also, a single tape recording and reproduction machine may have systems of the invention for controlling the tape transport speed during both rewinding and fast-forward operation.

What is claimed is:

1. In a magnetic tape drive system for a magnetic recording and reproduction device having a tape supply reel driven by a first motor and a tape take-up reel driven by a second motor, the improvement comprising:

first control means responsive to the rotational speed of the first motor and operative to maintain the rotational speed of the first motor at a predetermined value during the first half of a fast tape winding operation;

second control means responsive to the rotational speed of the second motor and operative to maintain the rotational speed of the second motor at the predetermined value during the second half of a fast tape winding operation;

said second control means being automatically rendered inoperative during the first half of the fast tape winding operation when the rotational speed of the second motor is below the predetermined value, and said first control means being automatically rendered inoperative during the second half of the fast tape winding operation when the rotational speed of the first motor is below the predetermined value.

2. A magnetic tape drive system according to claim 1 in which the first and second motors are electric motors communicable with a source of electrical power, and in which:

said first control means comprises means for sensing the rotational speed of the first motor and means for increasing the electric current flow through the second motor in a direction to brake the first motor when the rotational speed of the first motor exceeds the predetermined value; and said second control means comprises means to sense the rotational speed of the second motor and means to increase the current flow through the second motor in a direction to reduce the rotational speed thereof when the rotational speed of the second motor exceeds the predetermined value.

3. A magnetic tape drive system according to claim 2, in which said means of said second control means for sensing the rotational speed of the second motor is responsive to the counter-electromotive force of the second motor, and is operative to actuate said means to increase the current flow through the second motor when the sensed counter-electromotive force is above a predetermined value corresponding to said predetermined value of the rotational speed of the second motor.

4. A magnetic tape drive system according to claim 2, in which said means of said first and second control means for increasing the current flow through the second motor is an electrical valve which is common to both said first and second control means and which is connected in a series circuit arrangement with the second motor and the source of electrical power.

5. A magnetic tape drive system according to claim 4, in which said electrical valve is a transistor.

6. A magnetic tape drive system according to claim 4, in which said means of said first control means for sensing the rotational speed of the first motor is responsive to the current flow through the first motor, and is operative to actuate said means to increase the current flow through the second motor when the current through the first motor drops below a predetermined value corresponding to said predetermined value of the rotational speed of the first motor.

7. A magnetic tape drive system according to claim 4, in which said means of said second control means for sensing the rotational speed of the second motor comprises:

a first transistor having its base connected to the source of electrical power through an electrical bias source, its emitter connected to the junction between the second motor and said transistor constituting said electrical valve and its collector connected to the base of said transistor constituting said electrical valve;

said first transistor being arranged to conduct when the counter-electromotive force of the second motor appearing at its emitter exceeds said predetermined value corresponding to said predetermined value of the rotational speed of the second motor and thereby increase the current flow through said electrical valve and thereby the second motor.

8. A magnetic tape drive system according to claim 4, in which said means of said first control means for sensing the rotational speed of the first motor comprises:

a resistor connected in a series circuit arrangement with the first motor and the source of electrical power;

a first transistor having its emitter connected to the junction between the first motor and said resistor and its base connected to an electrical bias source;

a second transistor having its base connected to the collector of said first transistor and its emitter connected to the source of electrical power, the collector of said second transistor being connected to the base of said transistor constituting said electrical valve;

said first and second transistors being arranged to conduct and thereby increase the current flow through said electrical valve and thereby the second motor when the voltage at the junction between the first motor and said resistor drops below a predetermined value corresponding to said predetermined value of current flow through the first motor corresponding to the predetermined value of the rotational speed thereof.

* * * * *